United States Patent [19]
Garmaise et al.

[11] 3,718,657
[45] Feb. 27, 1973

[54] CERTAIN-2-SUBSTITUTED-1,2,3,4-TETRAHYDRO-BETA OR GAMMA CARBOLINES

[75] Inventors: David Lyon Garmaise, Montreal; Gerard Yvon Paris, Duvernay, Quebec, both of Canada; Nicholas Peter Plotnikoff, Lake Bluff, Ill.

[73] Assignee: Abbott Laboratories, North Chicago, Ill.

[22] Filed: Dec. 3, 1970

[21] Appl. No.: 94,984

[52] U.S. Cl. ............................. 260/296 A, 424/263
[51] Int. Cl. .......................................... C07d 31/42
[58] Field of Search ........................... 260/296 A

[56] References Cited

OTHER PUBLICATIONS

Winterfeldt et al., Chem. Ber. 100 (11) pages 3801–3807 (1967).

Primary Examiner—Alan L. Rotman
Attorney—Robert L. Niblack

[57] ABSTRACT

A new series of closely related compounds, the $\beta$- and $\Delta$-carbolines carrying on the piperidino-nitrogen an unsaturated hydrocarbon side chain with three carbon atoms, was found to possess valuable anti-depressant activity with an unusually high therapeutic index.

6 Claims, No Drawings

CERTAIN-2-SUBSTITUTED-1,2,3,4-TETRAHYDRO-BETA OR GAMMA CARBOLINES

DETAILED DESCRIPTION OF THE INVENTION

Anti-depressants have become an important pharmaceutical class of drugs useful in many depressive states but many of the compounds used to date unfortunately have various side effects such as relatively high toxicity which raises the danger of overdosage, emetic reactions or secondary effects on the central nervous system aside from the desired relief of depressive states. It has now been found that a new class of chemical compounds is highly effective in the treatment of depressions while being substantially non-toxic.

The new compounds which are the object of the present invention are the β- and Δ-carbolines of the formula

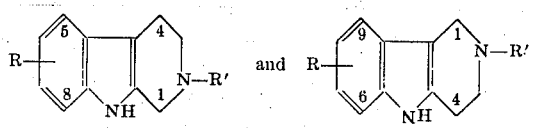

wherein R is hydrogen, methyl or fluorine and wherein R' is propargyl or allyl. These compounds are more often referred to as substituted 1,2,3,4-tetrahydropyridoindoles; particularly, the above β-carbolines are identified as 1,2,3,4-tetrahydro-9H-pyrido[3,4-b]indoles and the Δ-carbolines are referred to as 1,2,3,4-tetrahydro-5H-pyrido[4,3-b]indoles. The $LD_{50}$ of these compounds, upon oral administration, is above 1000 mg./kg. while the intraperitoneal $LD_{50}$ values vary between 500 and above 1000 mg./kg. The anti-depressant activity of the new compounds was measured by the method of G.M. Everett, described in Excerptia Int. Congress, Series 122, page 164–7. This test is commonly referred to as "modified DOPA-test" and uses an activity scale of 1–3 with activity 3 signifying a pronounced anti-depressant effect. Most of the new compound have an activity on this scale ranging between 1 and 3 at an oral dose of 25 mg./kg. and in all cases, significant activity is found at 100 mg./kg. in animals.

The new compounds can easily be prepared by reacting the properly substituted β- and Δ-carbolines with allyl bromide or propargyl bromide in a suitable inert, organic reaction medium, using a 50 to 100 percent excess of the carboline over the molar equivalent amount of the hydrocarbon bromide. Usually, the ensuing yields are 60 percent or above, even when working on a very small scale.

In order to illustrate the preparation of making the new compounds, reference is made to the following examples, which however, are not intended to limit the invention in any respect.

EXAMPLE 1

2-Propargyl-6-Methyl-1,2,3,4-Tetrahydro-9H-Pyrido[3,4-b]Indole

To a solution of 5.6 g. of 6-methyl-1,2,3,4-tetrahydro-9H-pyrido[3,4-b]indole in 100 ml. of N,N-dimethylformamide is added 1.8 g. of propargyl bromide. The reaction mixture is stirred at room temperature for 30 minutes and then evaporated to dryness. The residue is treated with 200 ml. of acetone and excess 6-methyl-β-carboline hydrobromide is filtered off. The filtrate is again evaporated to dryness to yield 1.7 g. of 2-propargyl-6-methyl-1,2,3,4-tetrahydro-9H-pyrido[3,4-b]indole melting at 190°–192° C. after further recrystallization from ethanol. This compound shows an oral activity of 2 on the above described modified DOPA-test scale at 25 mg./kg. in mice.

EXAMPLE 2

2-Propargyl-8-Methyl-1,2,3,4-Tetrahydro-9H-Pyrido[3,4-b]Indole

By repetition of the procedure described in Example 1 but using 8-methyl-1,2,3,4-tetrahydro-9H-pyrido[3,4-b]indole as the starting material, 2-propargyl-8-methyl-1,2,3,4-tetrahydro-9H-pyrido[3,4-b]indole is obtained in a yield of 65 percent of theory. An analytical sample obtained by ethanol recrystallization melts at 176°–178° C. It shows activity 1 at 25 mg./kg. and activity 2 at 100 mg./kg. after oral administration to mice.

EXAMPLE 3

2-Propargyl-1,2,3,4-Tetrahydro-9H-Pyrido[3,4-b]Indole

By using unsubstituted 1,2,3,4-tetrahydro-9H-pyrido[3,4-b]1, 2-propargyl-1,2,3,4-tetrahydro-9H-pyrido[3,4-b]indole is obtained in a yield of 52 percent showing a melting point of 206°–208° C. after recrystallization from ethanol. The compound shows an activity of 2 at an oral dose of 25 mg./kg. in mice.

EXAMPLE 4

2-Propargyl-6-Fluoro-1,2,3,4-Tetrahydro-9H-Pyrido[3,4-b]Indole

By using 6-fluoro-1,2,3,4-tetrahydro-9H-pyrido[3,4-b]indole as the starting material for the process of Example 1, 2-propargyl-6-fluoro-1,2,3,4-tetrahydro-9H-pyrido[3,4-b]indole is obtained in a yield of 67 percent of theory. The pure compound obtained by recrystallization from ethanol melts at 190°–192° C. The compound shows activity 3 in the above mouse test at an oral dose of 25 mg./kg.

EXAMPLE 5

2-Allyl-6-Fluoro-1,2,3,4-Tetrahydro-9H-Pyrido[3,4-b]Indole

In a repetition of the procedure shown in Example 4 but using allyl bromide as the co-reactant, 2-allyl-6-fluoro-1,2,3,4-tetrahydro-9H-pyrido[3,4-b]indole is obtained in a yield of 64%. An analytical sample melts at 128°–130° C. (ethanol) and the compound shows an activity of 2 at an oral dose of 25 mg./kg. in mice.

EXAMPLE 6

2-Allyl-6-Methyl-1,2,3,4-Tetrahydro-9H-Pyrido[3,4-b]Indole Hemihydrate

In a repetition of Example 1 but using 1.8 g. of allyl bromide in place of propargyl bromide, 2-allyl-6-methyl-1,2,3,4-tetrahydro-9H-pyrido[3,4-b]indole hemihydrate is obtained in a yield of 68 percent of theory. An analytical sample melts at 144°–146° C. (ethanol).

EXAMPLE 7

2-Allyl-1,2,3,4-Tetrahydro-9H-Pyrido[3,4-b]Indole

By repeating the procedure of Example 3 but using allyl bromide as the co-reactant, 2-allyl-1,2,3,4-tetrahydro-9H-pyrido[3,4-b]indole is obtained in a yield of 63% of theory. An analytical sample melts at 153°–155° C. (ethanol) and the compound shows an activity of 3 in the above modified DOPA test at an oral dose of 100 mg./kg. in mice.

EXAMPLE 8

2-Allyl-8-Fluoro-1,2,3,4-Tetrahydro-5H-Pyrido[4,3-b]Indole Hydrochloride

A mixture of 10.2 g. of 8-fluoro-1,2,3,4-tetrahydro-5H-pyrido[4,3-b]indole hydrochloride, 6.8 g. of allyl bromide, 11.2 g. of anhydrous potassium carbonate and 11.3 g. of potassium iodide in 130 ml. of N,N-dimethylformamide is heated for 7 hours at 80°–85° C. The mixture is then cooled and poured in 1 liter of water. The organic layer is extracted with 3 portions of 50 ml. each of chloroform. The chloroform extracts are combined, washed with water, dried over magnesium sulfate and evaporated under reduced pressure. The residue is treated with methanolic hydrochloric acid to give 2-allyl-8-fluoro-1,2,3,4-tetrahydro-5H-pyrido[4,3-b]indole hydrochloride in a yield of 2.3 g. An analytical sample of this salt melts at 271°–219° C. (methanol) and shows an activity of 1 at 100 mg./kg. upon oral administration to mice. This compound is also found to be highly active against *T. cruzi*, showing a minimum inhibitory concentration of 1 part per million on an in vitro test.

As seen from the above examples, the new compounds can be prepared in an extremely simple fashion and they are obtained in good yields. Also, as shown above, these compounds are highly active as antidepressants at low doses while their toxicity is so low that in most instances, a $LD_{50}$ cannot be established.

The new compounds can be administered orally or intraperitoneally and are preferably used in form of their non-toxic acid addition salts. Among these salts are the succinate, acetate, citrate, tartrate, hydrochloride, phosphate, sulfate and the like. The free base or its salts can easily be compounded into standard pharmaceutically acceptable dosage forms such as pills, tablets, syrups, wafers, capsules and the like. They can be combined with the usual excipients such as fillers, flavoring agents, coloring agents and other pharmaceutically acceptable diluents.

The β- or Δ-carbolines described above or their non-toxic acid addition salts are preferably administered orally to warm-blooded animals to alleviate depressions at a single dose of between 10 and 100 mg./kg. of body weight or at a daily dose of between 1–100 mg./kg. body weight. In large animals, one-half of this dose range or less is usually sufficient and, if parenteral administration is desired, the above dose range can easily be reduced to between 25 and 50 percent.

We claim:

1. A β- or Δ-carboline of the formula

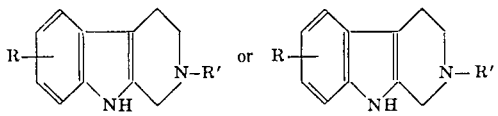

wherein R is methyl or fluorine and R' is propargyl or allyl or a non-toxic acid addition salt thereof.

2. The β-carboline of claim 1 wherein R is attached at the 6-position.

3. The Δ-carboline of claim 1 wherein R is attached to the 8-position.

4. The β-carboline of claim 1 wherein R is fluorine in the 6-position and R' is allyl.

5. The β-carboline of claim 1 wherein R is methyl in the 6-position and R' is propargyl.

6. The β-carboline of claim 1 wherein R is fluorine in the 6-position and R' is propargyl.

* * * * *